United States Patent [19]
Hasegawa et al.

[11] Patent Number: 5,653,037
[45] Date of Patent: Aug. 5, 1997

[54] APPARATUS AND METHOD FOR MEASUREMENT OF TAPPED HOLE

[75] Inventors: Kiyoshi Hasegawa, Tochigi-ken; Hidehiro Manabe, Atsugi; Ryuji Fukada, Sagamihara, all of Japan

[73] Assignee: Nissan Motor Co., Ltd., Kanagawa-ken, Japan

[21] Appl. No.: 558,401

[22] Filed: Nov. 16, 1995

[30] Foreign Application Priority Data

Nov. 18, 1994 [JP] Japan ................. 6-285475

[51] Int. Cl.$^6$ ........................... G01B 13/10
[52] U.S. Cl. .............. 33/543.1; 33/DIG. 2; 33/199 R; 73/37.9
[58] Field of Search ................ 33/542.1, 785, 33/542, 543.1, 544, 544.5, 544.6, 555.1, DIG. 2, 199 R; 73/37.9

[56] References Cited

U.S. PATENT DOCUMENTS

| | | | |
|---|---|---|---|
| 2,358,769 | 4/1944 | Aller | 33/DIG. 2 |
| 2,594,077 | 4/1952 | Schulze | 33/DIG. 2 |
| 2,751,778 | 6/1956 | Mennesson | 73/37.9 |
| 4,016,747 | 4/1977 | Radev | 73/37.9 |
| 4,704,896 | 11/1987 | Parsons | 33/DIG. 2 |
| 4,872,269 | 10/1989 | Sattmann | 33/544 |
| 5,152,166 | 10/1992 | Brock et al. | 73/37.9 |

FOREIGN PATENT DOCUMENTS

| | | | |
|---|---|---|---|
| 484764 | 5/1992 | European Pat. Off. | 33/542 |
| 483402 | 5/1992 | European Pat. Off. | 33/544 |
| 2617590 | 1/1989 | France | 73/37.9 |
| 406117 | 7/1974 | U.S.S.R. | 73/37.9 |
| 1379619 | 3/1988 | U.S.S.R. | 73/37.9 |

*Primary Examiner*—Thomas B. Will
*Attorney, Agent, or Firm*—Lowe, Price, LeBlanc & Becker

[57] ABSTRACT

A tapped hole measuring apparatus available for automatically measuring the major diameter, minor diameter, effective diameter and depth of a tapped hole. The apparatus comprises a measuring stylus with at least two air discharging ports which can take inserting movement into the tapped hole. The apparatus separately measures the variations of the back pressures of air supplied to the air discharging ports, and converts the back pressure variations into electric signals and stores them. Also included in the apparatus is a configuration calculating section for comparing the variation of the electric signal from the tapped hole with a variation of electric signal from a reference tapped hole to obtain the configurational dimensions of the tapped hole being measured.

6 Claims, 11 Drawing Sheets

APPARATUS AND METHOD FOR MEASUREMENT OF TAPPED HOLE

BACKGROUND OF THE INVENTION

1. Field of the Invention

The present invention relates to an apparatus and a method for automatically measuring geometries, or configurational dimensions, of a tapped hole in a work, such as an effective diameter, a minor diameter, a major diameter, and a hole depth.

2. Description of the Prior Art

One known technique to measure the inner diameter of a tapped hole involves using an inspection limit thread gauge 1 as shown in FIG. 1. More specifically, the go gauge and not-go gauge of the limit thread gauge 1 are alternately screwed manually in a tapped hole being measured (a target tapped hole), and if the go gauge can pass in a given effective screw depth range while the not-go gauge fails to be screwed up to a given depth, a decision is made such that the tapped hole being measured is within a tolerance range.

There is a problem which arises with such a prior tapped hole measuring method, however, in that the measurements depend upon the sensation of an inspector because of visual inspection, and the inspection per se relies on the inspector's skill, which makes it difficult to quantitatively measure the tapped hole. In addition, for mass-produced works, difficulty is encountered to carry out all the tapped hole measurements by hand.

SUMMARY OF THE INVENTION

It is therefore an object of the present invention to provide an apparatus and method which is capable of easily and quantitatively measuring geometries of a tapped hole, such as an effective diameter, a minor diameter, a major diameter, and an effective depth.

For this purpose, in accordance with the present invention, there is provided a tapped hole measuring apparatus comprises: stylus means having at least two air discharging ports, at least one of the two air discharging port being located at the vicinity of a tip portion of the stylus means; driving means for operating the stylus means so that the stylus means is inserted into the tapped hole being measured, and advances, retreats and rotates within the tapped hole; converting means for measuring a variation of a back pressure of air supplied to each of the air discharging ports to convert the measured back pressure variation into an electric signal; and configuration calculating means for storing a variation of an electric signal obtained by the converting means when the stylus means is previously inserted into a reference tapped hole, and for comparing the electric signal variation on the reference tapped hole with a variation of the electric signal obtained by the converting means when the stylus means is inserted into the tapped hole being measured to obtain a configuration of the tapped hole being measured.

That is, the stylus means is inserted into the tapped hole through the driving means and air is discharged from the plurality of air discharging ports of the stylus means to hit a thread or a root of the tapped hole, with the result that the back pressures at the air discharging ports vary. This back pressure variation is converted into an electric signal through the converting means so that the distances from the stylus means to the thread and root within the tapped hole are quantitated as electric signal values. At this time, with at least one of the air discharging ports being located in the vicinity of the tip portion of the stylus means, the depth of the tapped hole is quantitated as an electric signal value, besides the tapped hole diameter is quantitated through the other air discharging port. The configuration calculating means compares the electric signal value previously obtained using the reference tapped hole with the electric signal value obtained from the tapped hole being measured so as to calculate the configurational dimensions of the tapped hole being measured in relation to those of the reference tapped hole.

Preferably, at least one of the air discharging ports is made to be movable relatively to the others of the air discharging ports. With this arrangement, the at least two air discharging ports can be allowed to approach and separate from each other so as to be always within the tapped hole irrespective of variations of the depth of the tapped hole. Accordingly, the stylus means can be inserted up to a given position within the tapped hole to measure the tapped hole diameters and depth. At this time, one of the air discharging ports is used for the measurement of the tapped hole diameters, while the other located near the tip portion of the stylus means is used for the measurements of the tapped diameters and depth or only for the measurement of the depth.

More preferably, the stylus means has a plurality of air discharging ports arranged at an equal angular interval in its circumferential surface. Thus, for measuring the configurational dimensions over the overall circumference of the tapped hole, there is only a need for the stylus means to be rotated by half an angle between the adjacent air discharging ports formed at an equal angular interval.

Moreover, in accordance with this invention, there is provided a method for measuring a tapped hole, comprising the steps of: (a) positioning stylus means with air discharging ports relative to a reference tapped hole; (b) measuring a variation of a back pressure of air supplied to each of the air discharging ports in a state in which the stylus means advances within the reference tapped hole; (c) converting the back pressure variation, measured in the step (b), into an electric signal and storing a value of the converted electric signal; (d) obtaining a conversion value for converting the electric signal value into a distance value, on the basis of distances from a position of the positioned stylus means to a thread and a root of the reference tapped hole; (e) measuring a variation of a back pressure of air supplied to each of the air discharging ports in a state where the stylus means advances within the tapped hole being measured; (f) converting the back pressure, measured in the step (e), into an electric signal value; and (g) obtaining distances from the stylus means to a thread, a root and a bottom of the tapped hole being measured as a function of the electric signal value, converted in the step (f), using the conversion value obtained in the step (d) to calculate a major diameter, a minor diameter, an effective diameter and a depth of the tapped hole being measured.

That is, in this tapped hole measuring method, the stylus means with the air discharging ports is initially positioned relative to the reference tapped hole and then inserted thereinto while measuring the variations of the back pressures of air supplied to the air discharging ports. The back pressure variations are converted into electric signals and recorded as electric signal values which in turn, are converted into distances on the basis of the distances from the position of the positioned stylus means to the thread and root of the reference tapped hole, thus providing conversion values for converting the electric signal values corresponding to the back pressures due to the air supply into distances. Thereafter, the same stylus means is inserted into the tapped hole being measured while, in the same way, measuring the air back pressure variations due to the air discharge to perform the conversion of the measured back pressure variations into electric signals to be stored. The stored electric signals are used for obtaining the distances from the stylus means up to the thread and root of the tapped hole being measured on the basis of the conversion values obtained from the reference tapped hole, thereby calculating the major diameter, minor diameter, effective diameter and depth of the tapped hole being measured.

In addition, the stylus means has a plurality of air discharging ports arranged at an equal angular interval in its circumferential surface, and the stylus means is rotated by half an angle made between the adjacent air discharging ports when the stylus means turns from an advancing movement to a retreating movement within the tapped hole. With this rotational operation, the measurements in plural diameter-directions becomes possible only by one advancing and retreating movement.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
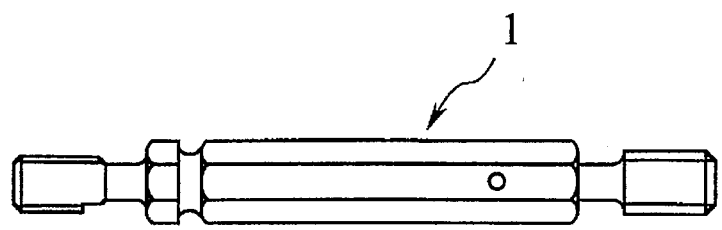
FIG. 1 is an illustration of a conventional inspection limit thread gauge for tapped hole measurements.
Figure 2:
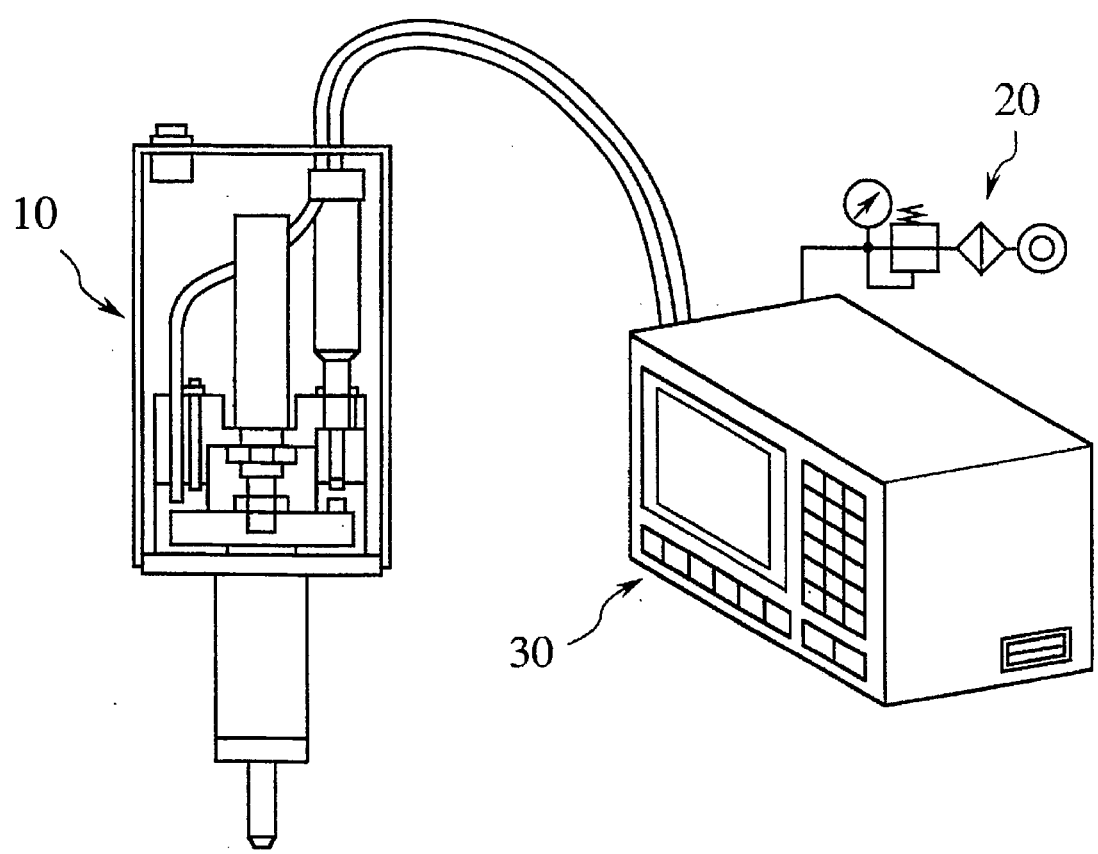
FIG. 2 is an illustration of a whole arrangement of a tapped hole measuring apparatus according to an embodiment of this invention.

A description will be made hereinbelow with reference to the accompanying drawings in terms of a tapped hole measuring apparatus and then a measuring method according to the present invention. FIG. 2 is an illustration of a whole arrangement of a taped hole measuring apparatus according to an embodiment of this invention. This measuring apparatus is equipped with a probe body 10 having a measuring stylus (a measuring section of a probe) including an air discharging port and taking care of advancing and retreating (forwarding and drawing) or rotating the measuring stylus, an air supply unit 20 serving to supply air and including a piezoelectric transducer (pressure-voltage converter) means for converting a back pressure measured into an electric signal, and a processing unit 30 acting as means which takes charge of controlling the advance, retreat and rotation of the measuring stylus and further of calculating a geometry of a tapped hole. In a state where the measuring stylus of the probe body 10 is inserted into a tapped hole, the air supply unit 20 measures the back pressure from the measuring stylus, before on the basis of the measured back pressure the processing unit 30 calculates the dimensions of the tapped hole.

Figure 3:
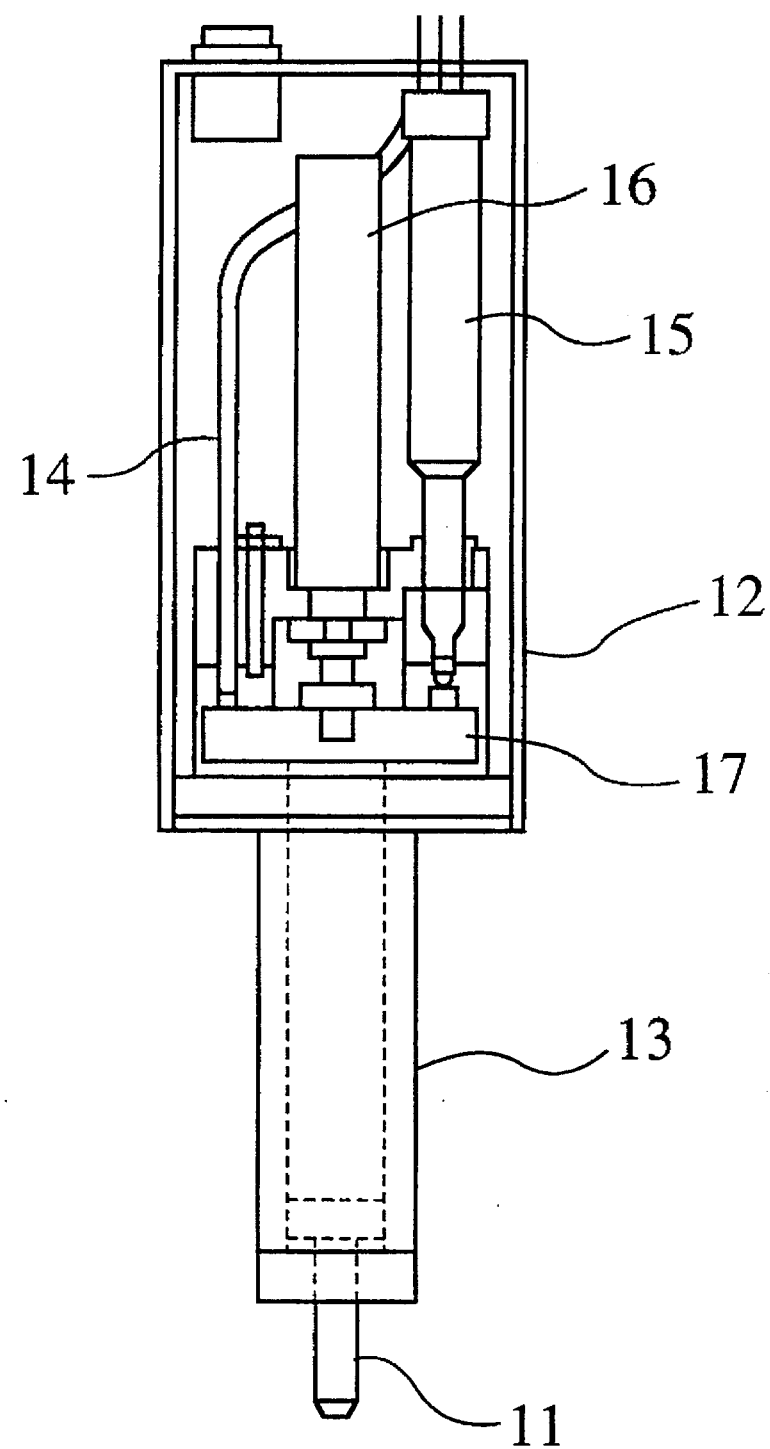
FIG. 3 is a front elevational view showing a structure of a probe body of the FIG. 2 tapped hole measuring apparatus.

The probe body 10 is shown in FIG. 3, as comprising a measuring stylus 11 with an air discharging port, a probe case 13 for supporting the measuring stylus 11 to allow it to freely advance and retreat into and from a body case 12 and further to rotate, a stepping motor 16 serving as a measuring stylus moving means housed within the body case 12 for carrying out the advance and retreat, and rotation of the probe case 13, a linear scale 15 for measuring the degrees of the advance and retreat of the measuring stylus 11 on the basis of the function of the stepping motor 16, an air hose 14 for leading air to an air circuit provided in the measuring stylus 11, a rotary coupler 17 for coupling the air from the air hose 14 to the air circuit while permitting the rotation of the measuring stylus 11, and a switch 18 provided within the body case 12 for giving instructions on start and termination of the measurements.

Figure 4A:
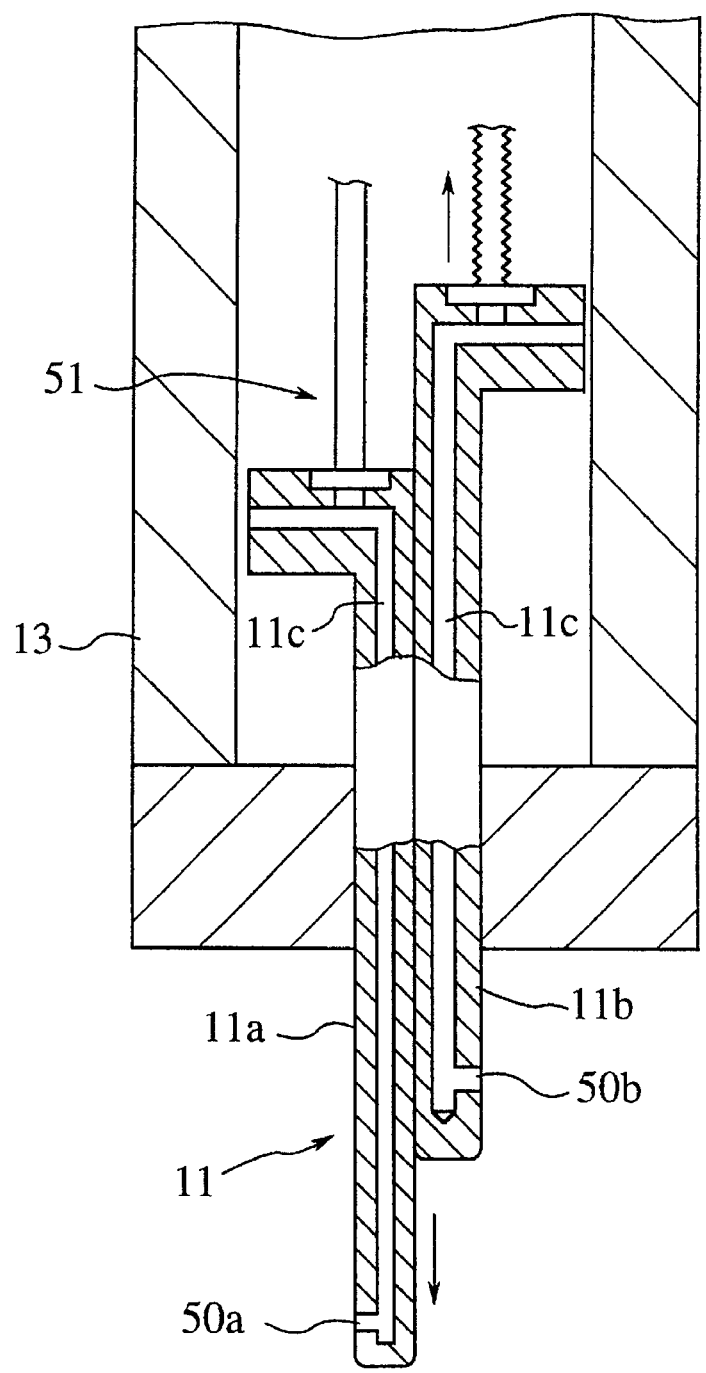
FIG. 4A is a cross-sectional view showing a construction of a measuring stylus provided within the probe body.
Figure 4B:
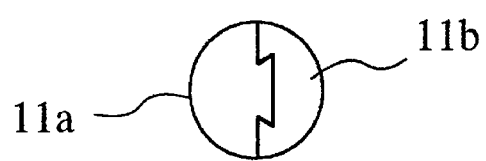
FIG. 4B is a plan view showing a tip portion of the measuring stylus.

The measuring stylus 11, as shown in FIG. 4A, is supported or born with the probe case 13 to develop the advance and retreat, and rotation, and has an air discharging port 50a at its tip portion and another air discharging portion 50b made at an intermediate position for discharging air in a direction opposite to the direction in which the air goes out from the first-mentioned air discharging port 50a. The air discharging ports 50a and 50b separately receive air from the air supply unit 20 through an air circuit 51. The air discharging ports 50a, 50b are made in hollow members 11a, 11b each having a semi-circular configuration as shown in FIG. 4B, the air being led thereto through air pipes 11c extending within the probe case 13. The semi-circular hollow members 11a, 11b can come into sliding engagement with each other by employment of a dovetail groove mechanism. Owing to drive means, not shown, the hollow member 11b with the air discharging port 50b can slide up and down (indicated by an arrow in FIG. 4A) so that both the air discharging ports 50a, 50b can relatively approach and separate from each other.

Figure 5:
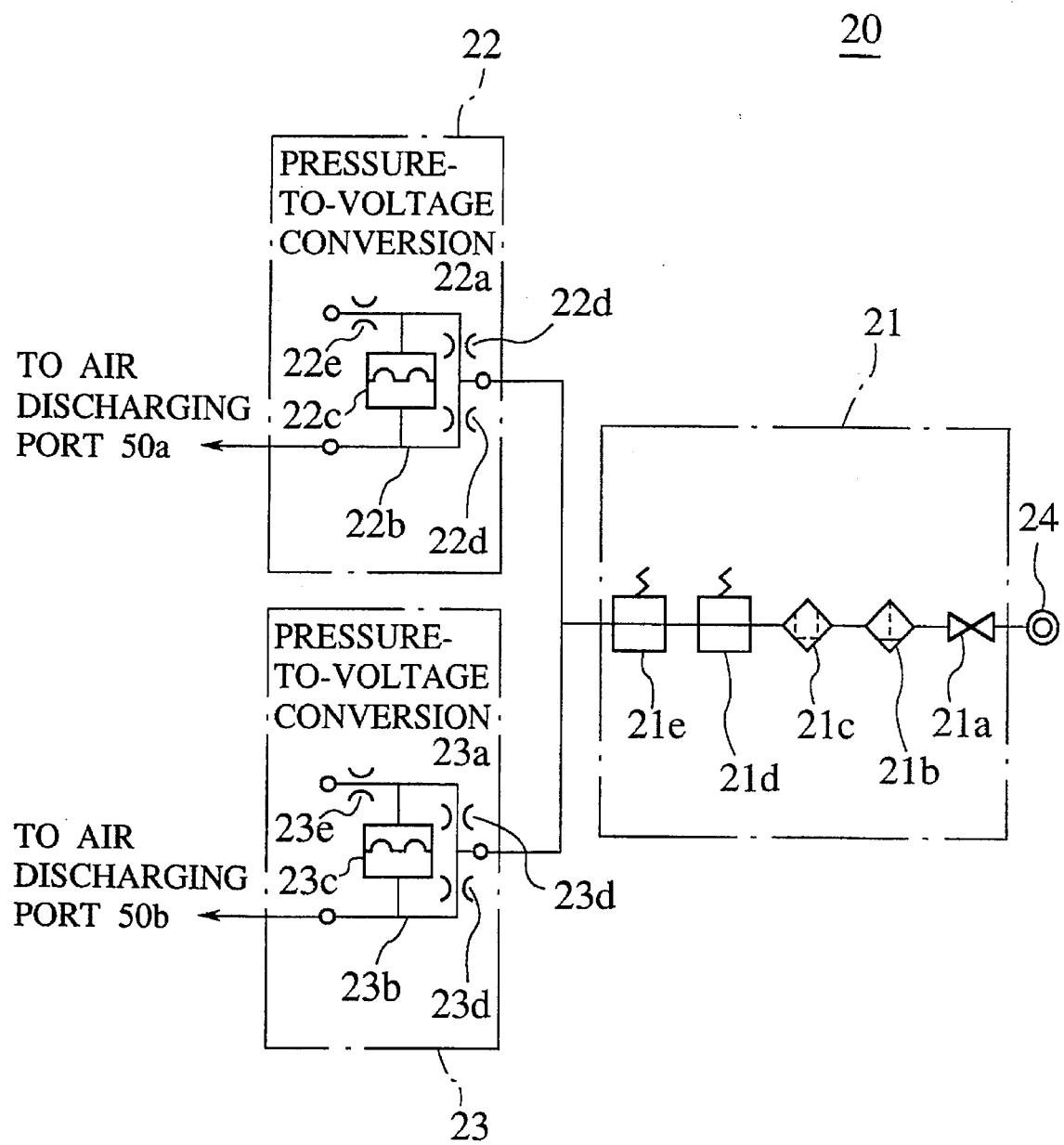
FIG. 5 is an illustration of an arrangement of an air supply unit of the tapped hole measuring apparatus.

The air supply unit 20 supplies air to both the air discharging ports 50a, 50b concurrent with including a piezoelectric transducer means for measuring the back pressure of the supplied air at each of the air discharging ports 50a, 50b to convert the measurement result into an electric signal. For example, as shown in FIG. 5 the air supply unit 20 is composed of an air regulating circuit 21 having an opening and closing valve 21a, a submicron filter 21b, an oil mist separator 21c, a regulator 21d and a pressure reducing valve 21e which are coupled in series to each other. Also included in the air supply unit 20 are pressure-voltage converters 22, 23 receiving the pressurized air, branched into two directions, from the air regulating circuit 21. Each of the pressure-voltage converters 22, 23 comprises a differential pressure measuring device 22c or 23c each having a pressure sensitive diaphragm, and branching circuits 22a, 22b or 23a, 23b for further branching the pressurized air from the air regulating circuit 21 to lead the branched air through a throttle valve 22d or 23d to both sides of the pressure sensitive diaphragm of the differential pressure measuring device 22c or 23c. Further, the one branching circuit 22a or 23a of each of the pressure-voltage converters 22, 23 allows the pressurized air to be open through the throttle valve 22e or 23e to the atmosphere, whereas the other branching circuit 22b or 23b serves as an air supply passage to supply the pressurized air up to the air discharging port 50a or 50b. The movements of the pressure sensitive diaphragms of the differential pressure measuring devices 22c, 23c, for example, produce the variations of electrostatic capacities or the variations of resistances of a bridge resistor circuit.

With this arrangement, the pressurized air from an air supply source such as an air pump 24 passes through the air regulating circuit 21 to remove dust and the like from the air, before passing through the pressure-voltage converters 22, 23 to reach the air discharging ports 50a, 50b at a constant pressure. The back pressure at the air discharging port 50a is converted into an electric signal in the pressure-voltage converter 22 and outputted therefrom, whereas the back pressure at the other air discharging port 50b is converted into an electric signal in the other pressure-voltage converter 23 and outputted therefrom.

Figure 6:
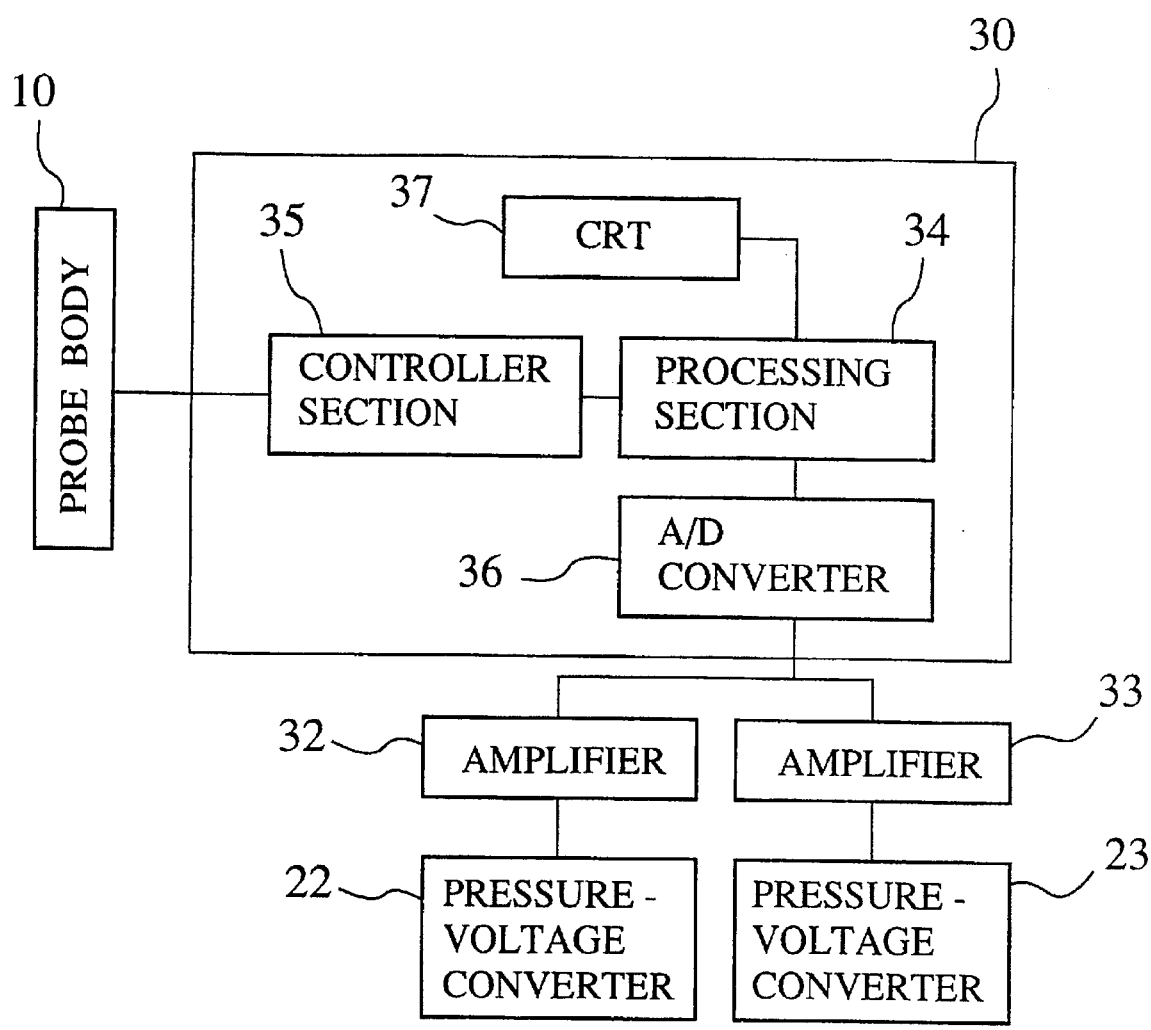
FIG. 6 is a block diagram showing an arrangement of a processing unit of the tapped hole measuring apparatus.

The processing unit 30 is provided with a processing section 34 for converting the electric signals from the pressure-voltage converters 22, 23 into a digital form and for comparing this digital signal with a measurement result of a reference tapped hole previously measured as will be described later so as to calculate the geometry of the tapped hole being measured, and additionally equipped with a controller section 35 for controlling the advance and retreat, and rotation of the measuring stylus 11. In FIG. 6 showing the functional arrangement of the processing unit 30, after being amplified in amplifiers 32, 33, the electric signals from the pressure-voltage converters 22, 23 are inputted into an A/D converter 36 to be converted into a digital signal, before entering the processing section 34. The processing section 34 processes the inputted signals so as to calculate the necessary configurational dimensions such as a depth, a major (thread) diameter, a minor (root) diameter and an effective (pitch) diameter of the tapped hole being measured, the calculation results being displayed on a CRT 37 or printed out through a printer, not shown. In addition, the controller section 35 actuates a stepping motor 16 within the probe body 10 to insert or retreat the measuring stylus 11 into and from the tapped hole at a given speed and further to control the rotational movement thereof.

Figure 7A:
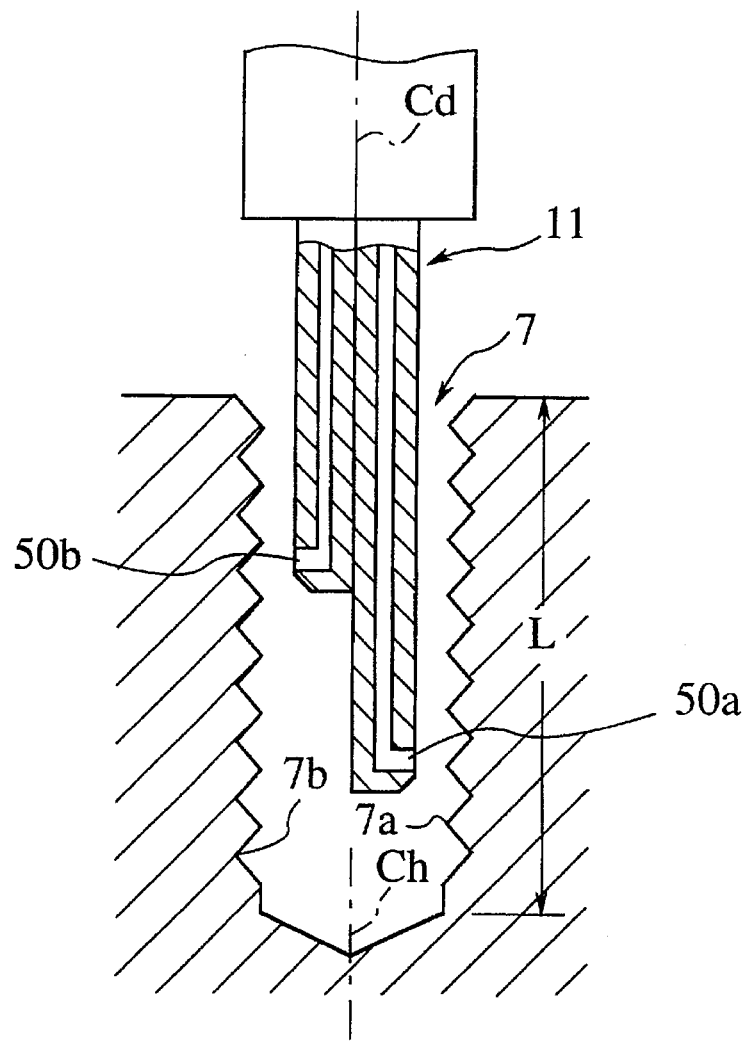
FIG. 7A is a cross-sectional view showing a state in which the measuring stylus is inserted into a tapped hole.
Figure 7B:
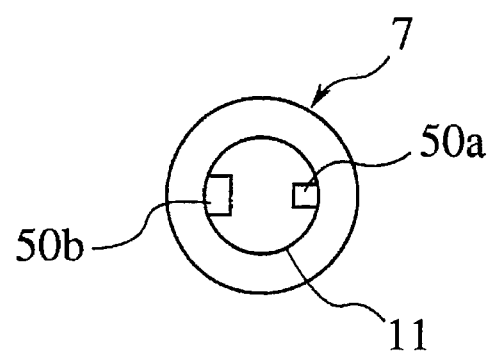
FIG. 7B is a plan view showing the same state as in FIG. 7A.
Figure 8:
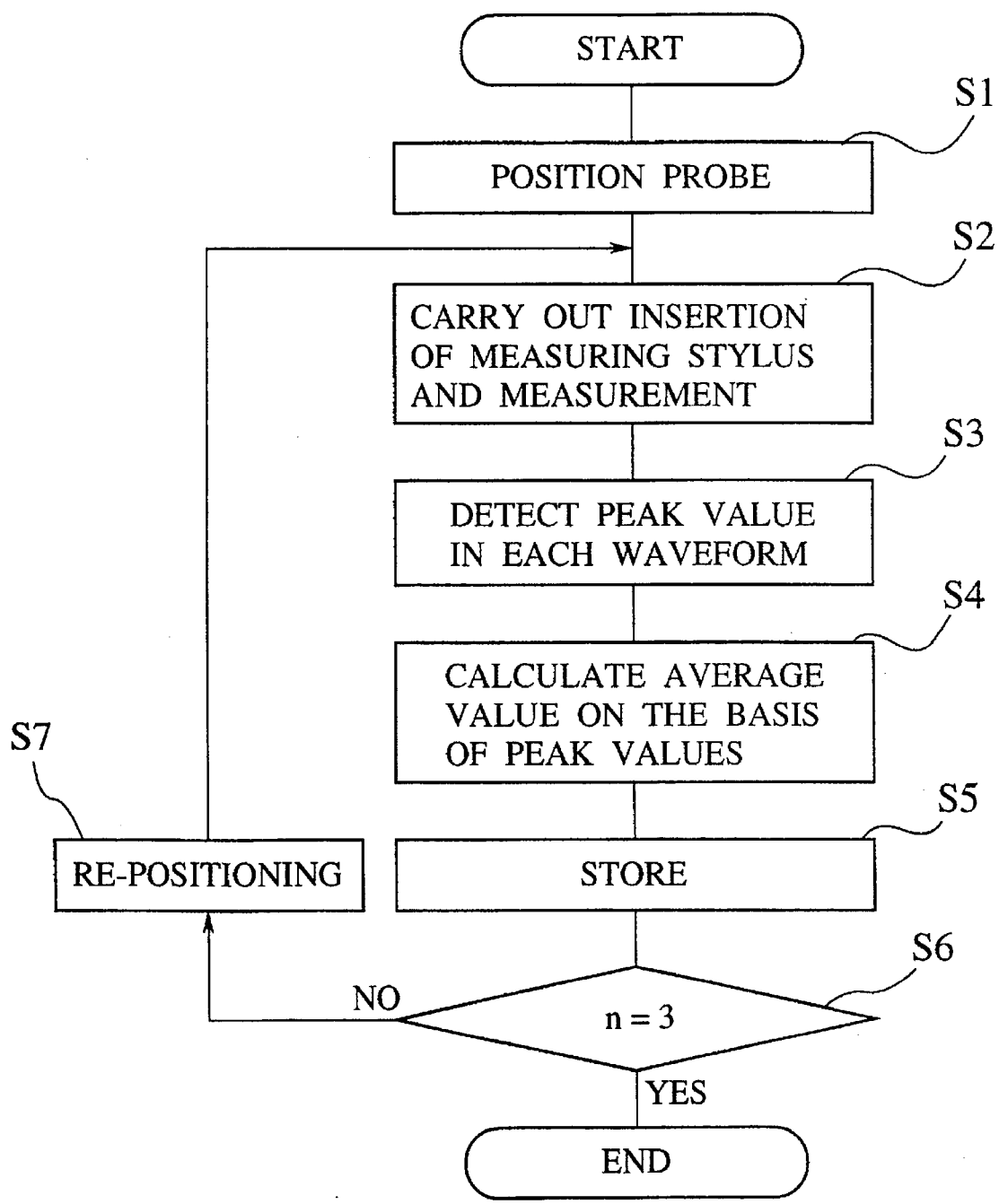
FIG. 8 is a flow chart available for describing a measurement of a reference tapped hole taken in a tapped hole measuring method according to another embodiment of this invention.
Figure 9:
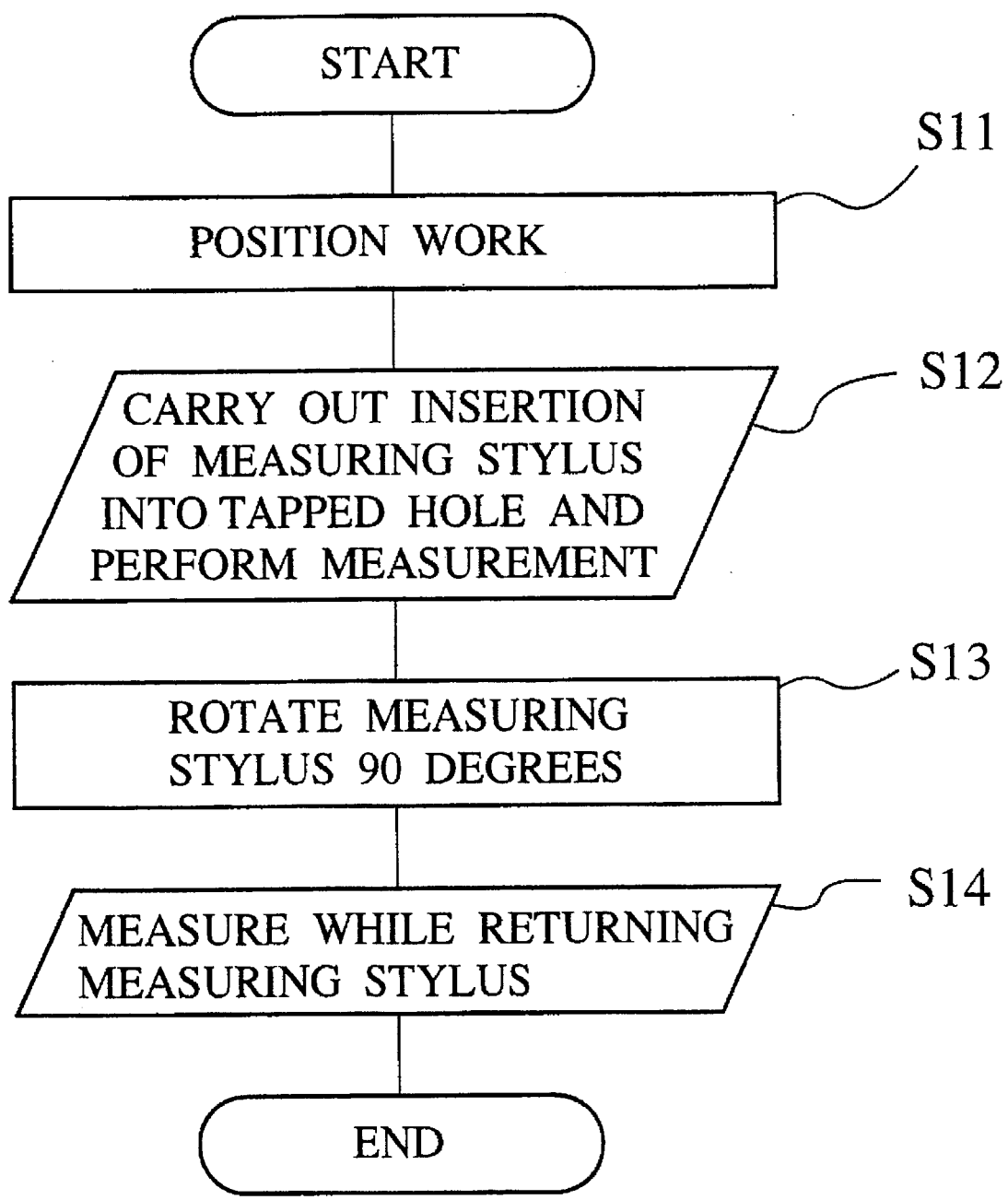
FIG. 9 is a flow chart useful for explaining a measurement of a tapped hole being measured in the tapped hole measuring method according to the same embodiment.

Secondly, a description will be made hereinbelow of a method of measuring a tapped hole using the above-described measuring apparatus. FIG. 7A is a cross-sectional view showing a state in which the measuring stylus 11 is inserted into the tapped hole, and FIG. 7B is a plan view showing the same state. Further, FIGS. 8 and 9 are flow charts showing operations programmed in the processing unit 30. In the first place, the description will begin with a basic operation of the measuring stylus for the tapped hole measurement based on the above-described measuring apparatus. The first step is taken to adjust the separation between both the air discharging ports 50a, 50b in accordance with the depth of a tapped hole being measured so that the tapped hole accommodates both the air discharging ports 50a, 50b. That is, assuming that the hole depth is 50 mm or 60 mm, the separation between the air discharging ports 50a, 50b is set to approximately 30 to 40 mm or 40 to 50 mm. At this instance, the adjustment therebetween can be accomplished by sliding the hollow member 11b with the one air discharging port 50b.

Subsequently, as shown in FIG. 7A the measuring stylus 11 is once inserted into the tapped hole 7 so that both the air discharging ports 50a, 50b come to given positions within the tapped hole 7. In this state, both the air discharging ports 50a, 50b of the measuring stylus 11 discharge air in order to measure the back pressures. At this time, the measuring stylus 11 is operated to further advance slightly, for example, a distance corresponding to several threads (about 10 mm), thereby achieving the measurement for two to several threads. Since as shown in FIG. 7B the two air discharging ports 50a, 50b are 180 degrees in angle with respect to one another, the air discharged therefrom advance in opposite directions, with the result that one inserting operation completely allows the measurements of the tapped hole wall surface in the diameter directions. In addition, the air discharging port 50a located at the tip portion of the measuring stylus 11 can simultaneously carry out not only the measurement of the inner diameter of the tapped hole but also the measurement of the depth L thereof.

When the measuring stylus 11 is inserted into the tapped hole up to a given depth or when the tapped hole bottom is detected, the measuring stylus 11 rotates 90 degrees before turning into a retreating action to measure a wall surface different by 90 degrees from the measurement (diameter) performed at the time of the inserting movement before going toward the outside of the tapped hole. The insertion, 90-degree rotation and retreating action permit the measurements of two diameter-direction dimensions and the depth L.

Figure 10:
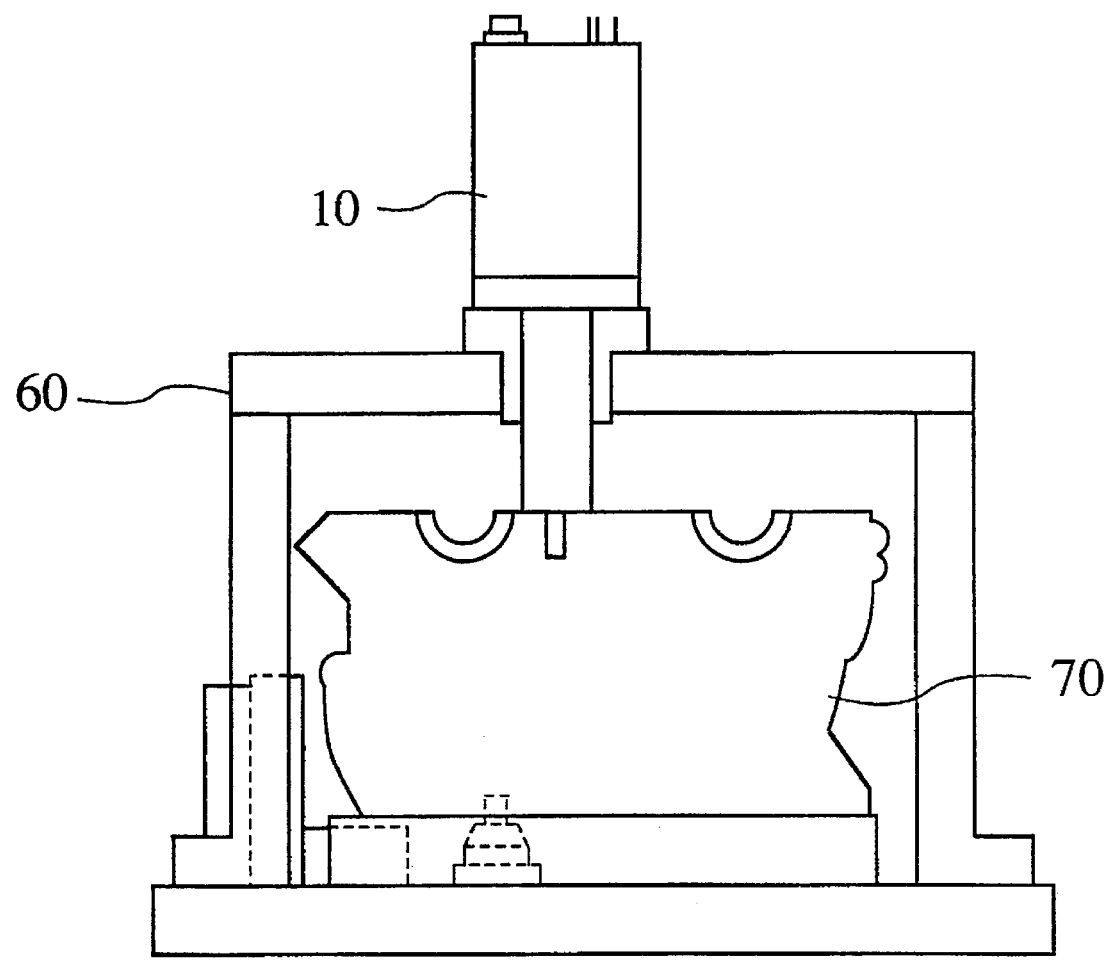
FIG. 10 is an explanatory illustration for a tool useful for setting the probe body and a work in the tapped hole measuring method.

A concrete measuring operations will be described hereinbelow in conjunction with the flow charts of FIGS. 8 and 9. A measurement is first made on a reference tapped hole so as to define the relationship between a back pressure due to the air discharge and a distance being measured in accordance with the flow chart of FIG. 8 and another measurement is then made on a target tapped hole in accordance with the flow chart of FIG. 9. In the measurement of the reference tapped hole as shown in FIG. 8, a reference work 70 with a reference tapped hole and the probe body 10 are set on a positioning tool (jig) 60 as shown in FIG. 10 (step S1). At this time, the center Cd of the measuring stylus 11 is positioned to be aligned with the center Ch of the reference tapped hole (see FIG. 7A).

Figure 11A:
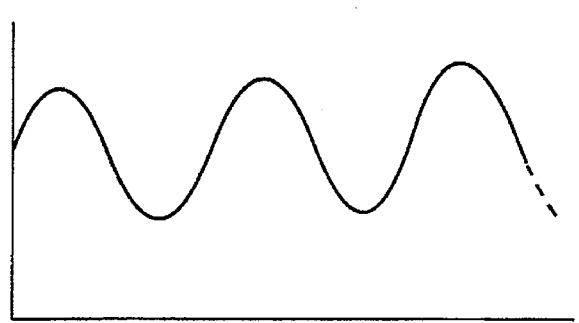
FIGS. 11A to 11C show voltage waveforms obtained by measurement of a reference tapped hole in the tapped hole measuring method according to this embodiment.

Subsequently, the measuring stylus 11 is inserted up to a predetermined position within the tapped hole, before air is discharged from each of the air discharging ports 50a, 50b to measure voltages corresponding to the back pressures while the measuring stylus 11 further advances slightly (step S2). The measurement result is shown as a voltage waveform in FIG. 11A, where voltage peaks appear to be coincident with the threads. The voltage peak values are detected from the voltage waveform (step S3), before averaged (step S4) and stored (step S5).

Figure 11B:
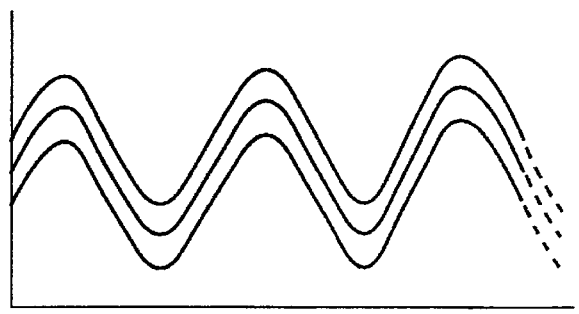
Figure 11C:
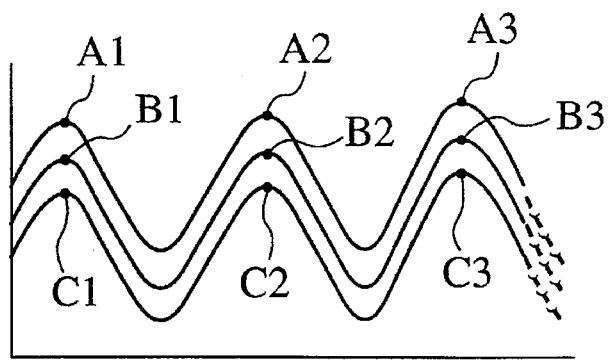

The operation from the step S2 to the step S5 is repeatedly performed predetermined number of times. In this embodiment, the predetermined number of repetitions is three, and hence, check is made whether or not the number of repetitions n=3 (step S6). If still not reaching n=3, the probe body 10 is precisely shifted to be repositioned by means of a microgauge, not shown, provided within the positioning tool 60 (step S7). Following this, the operational flow returns to the step S2 to again perform the operations from the step S2 to the step S5. FIG. 11B shows voltage waveforms obtained due to three measurements, and FIG. 11C illustrates the same waveforms wherein peaks are marked with reference numerals: the first peaks are designated at A1 to A3, the second peaks are denoted at B1 to B3, and the third peaks are indicated by C1 to C3.

Figure 12:
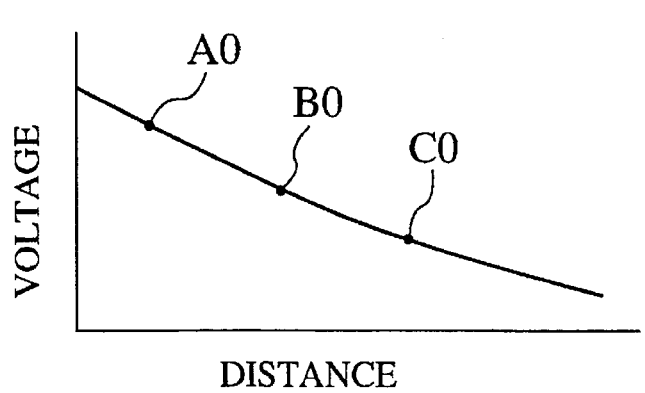
FIG. 12 is a graphic illustration of the relationship between voltages and distances.

Accordingly, the average value of the peak values in the three voltage waveforms, i.e., the variation of the back pressure at the threads of the reference tapped hole, and the distance from the center Cd of the measuring stylus 11 to the thread Ch of the reference tapped hole measured with the microgauge are found in terms of the air discharging ports 50a, 50b. FIG. 12 is a graphical presentation showing the voltage values corresponding to the back pressures plotted as a function of the distances from the center Cd of the measuring stylus 11 to the thread 7a (see FIG. 7A), wherein the peak average values are designated at A0, B0 and C0, respectively. As obvious from this graphic illustration, the voltage values and the distances are in substantially proportional relation to each other. A conversion value (or a conversion equation) is obtainable from this graph, the obtained conversion value being employed for converting the voltage value into the corresponding distance as will be described later.

After the measurement of the reference tapped hole, the operation proceeds to the measurement of the target tapped hole as shown in FIG. 9. As in the measurement of the reference tapped hole, after a work with the target tapped hole is set on the positioning tool 60 (step S11), the measuring stylus is inserted up to a given position within the tapped hole, and the air is discharged from the air discharging ports 50a, 50b in a state in which the measuring stylus 11 advances in order to measure the voltage values corresponding to the back pressures due to the air discharges (step S12). The inserting depth of the measuring stylus 11 will be known from the kind of the work or the specification, and the measuring stylus is inserted into the tapped hole up to the hole depth L. In this measurement, in accordance with the advancing movement of the measuring stylus 11 the configurational dimensions of several threads are detected as the variations of the back pressures at the air discharging ports 50a, 50b. In addition, the hole depth is detected on the basis of the variation of the back pressure at the air discharging port 50a. If it is expected that the depth of the tapped hole being measured is in an unfinished state, a threshold can be set for the voltage values resulting from the variations of the back pressure at the air discharging port 50a. In case that the voltage value varies to exceed the threshold, a decision is made such that the tapped hole is still not completely finished, and the insertion of the measuring stylus 11 is stopped on this decision.

When reaching a predetermined depth, the measuring stylus 11 is rotated 90 degrees (step S13), before a similar measurement is further carried out while the measuring stylus 11 returns (step S14).

The voltage values corresponding to the back pressures at the air discharging ports 50a, 50b, measured in accordance with the inserting and returning movements of the measuring stylus 11, are converted into the distances from the center of the measuring stylus 11 to the threads and roots of the tapped hole at the air discharging ports 50a, 50b on the basis of the conversion values (or the conversion equation) obtained from the FIG. 11 conversion graph made out by the measurement of the aforesaid reference tapped hole. The calculated distances at the air discharging ports 50a, 50b are added up, thus resulting in obtaining the major and minor diameters and the effective diameters during the insertion of the measuring stylus 11 and during the returning thereof. Moreover, the tapped hole depth is detectable on the basis of the voltage value due to the air discharging port 50a at the time of the completion of the insertion.

As described above, according to this embodiment, with one inserting and returning movement, the configurational dimensions such as the major and minor diameters and effective diameters in the two orthogonal directions are detectable while the measuring stylus 11 is within the tapped hole. In addition, since the two air discharging ports 50a, 50b are movably designed to be close to each other and separate from each other, the two air discharging ports 50a, 50b can always completely enter the tapped hole being measured. Thus, if the measuring stylus is moved forward a distance corresponding to several threads after being once completely inserted into the tapped hole, in addition to the measurements of its diameters relying on both the air discharging ports, the measurement of its depth also becomes possible by the help of the air discharging port placed at the tip portion of the measuring stylus. Accordingly, there is no need for the measurement to be continued until the measuring stylus gradually advances and reaches the hole bottom, and hence the measurement becomes simpler and is made faster.

Figure 13:
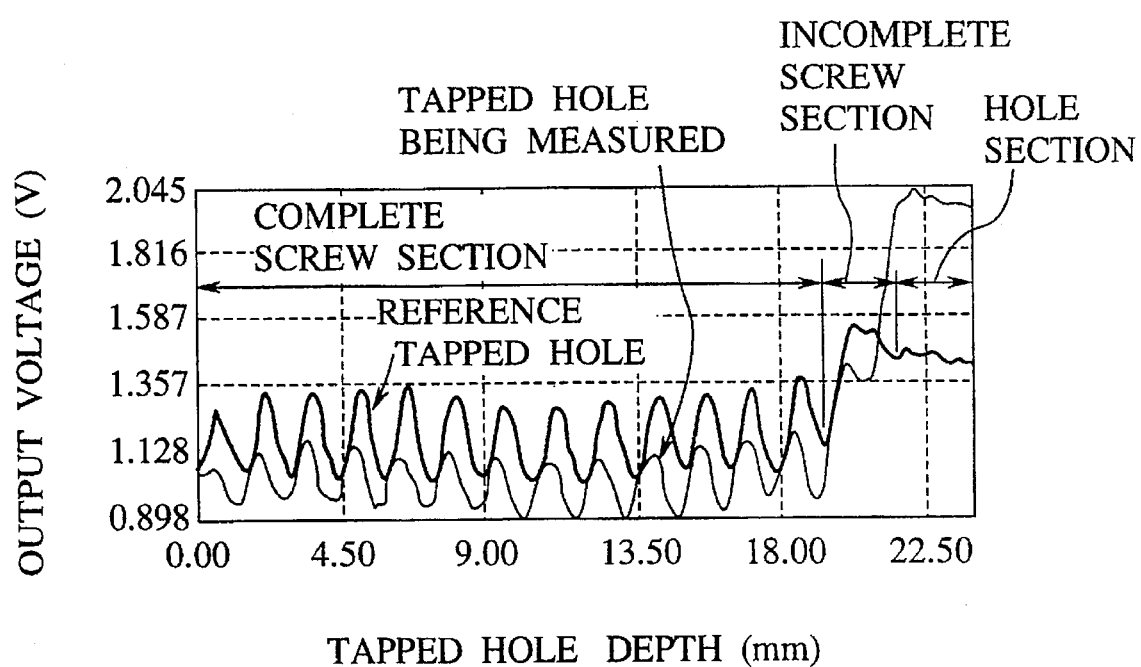
FIG. 13 is a graphic presentation useful for describing one example of an application of this invention to an simple measurement.

Furthermore, a description will be made of a simplified way of using this invention. FIG. 13 is a graphic presentation wherein a voltage waveform being a measurement result of the tapped hole is shown together with a voltage waveform being a measurement result of the reference tapped hole. Let it be assumed that the measurement is made to check only whether or not the tapped hole is within the tolerance range, with no necessity of detailed dimensions thereof. In this case, as shown in the graphic illustration the voltage values obtained from the target tapped hole and the voltage values obtained from the reference tapped hole are plotted so that both the values can be compared with each other. With only this comparison, a decision can easily be made as to whether the tapped hole being measured is within the tolerance range.

Although in the above-described embodiment the air discharging ports are two in number, the number of the air discharging ports is not limited to two. If four air discharging ports are provided in opposite relation, the measurement of the tapped hole inner diameters in two directions becomes possible without the rotation of the measuring stylus (step S13 in FIG. 9). In addition, if a rotational movement is added, the measurement of the inner diameters in four directions is practicable with a rotation of 45 degrees.

As described above, in the tapped hole measuring apparatus according to this invention, two or more air discharging ports are formed in the measuring stylus so that the inner diameters are measurable at a time, and the distances from the measuring stylus is calculated in such a way that the dimension measuring means makes comparisons on the basis of the conversion values previously obtained from the reference tapped hole. This arrangement allows easy, quick and accurate automatic measurements of the configurational dimensions of the tapped hole. In addition, since at least one of the air discharging ports is located at the tip portion of the measuring stylus, the distance to the hole bottom is always measurable, and the collision of the measuring stylus against the hole bottom is avoidable.

Moreover, in the tapped hole measuring apparatus according to this invention, at least two air discharging ports of the measuring stylus are designed to be movable relative to each other and the two air discharging ports are made to approach and separate from each other. Accordingly, the air discharging ports are movable in accordance with the depth of the tapped hole being measured, with the result that all the air discharging ports can always enter the tapped hole, which can carry out the measurements for at least two portions at a time. Whereupon, the measurements on the whole inserting and returning movements are not necessary, while the measurement can be achieved in such a way that the measuring stylus advances by a distance corresponding to several threads after being once inserted up to a given position within the tapped hole. This permits faster measurements.

Furthermore, since a plurality of air discharging ports are arranged at an equal angular interval, it is possible to simultaneously measure the inner diameters in plural directions. This also permits faster measurements.

Still further, in the tapped hole measuring method according to this invention, the reference tapped hole is initially measured so as to obtain the relationship between the back pressures at the air discharging ports and the distances from the measuring stylus on the basis of the measurement result of the reference tapped hole so that the configurational dimensions of the tapped hole being measured are calculated using the relationship therebetween. This method can accurately measure the geometry of the target tapped hole.

In addition, in the measuring method, a plurality of air discharging ports are provided in the measuring stylus and the measuring stylus is rotated by half the constant angle made between the air discharging ports when the measuring stylus turns from the inserting action to the returning action. Accordingly, the dimensions of the tapped hole inner diameters in plural directions are measurable.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An apparatus for measuring a tapped hole, comprising:
   stylus means having at least two air discharging ports, at least one of said two air discharging port being located at the vicinity of a tip portion of said stylus means;
   driving means for operating said stylus means so that said stylus means is inserted into said tapped hole being measured, and advances, retreats and rotates within said tapped hole;
   converting means for measuring a variation of a back pressure of air supplied to each of said air discharging ports to convert the measured back pressure variation into an electric signal; and
   configuration calculating means for storing a variation of an electric signal obtained by said converting means when said stylus means is previously inserted into a reference tapped hole, and for comparing the electric signal variation on said reference tapped hole with a variation of said electric signal obtained by said converting means when said stylus means is inserted into said tapped hole being measured to obtain a configuration of said tapped hole being measured.

2. A measuring apparatus as defined in claim 1, wherein at least one of said air discharging ports is made to be movable relatively to the others of said air discharging ports.

3. A measuring apparatus as defined in claim 1, wherein said stylus means has a plurality of air discharging ports arranged at an equal angular interval in its circumferential surface.

4. A measuring apparatus as defined in claim 2, wherein said stylus means has a plurality of air discharging ports arranged at an equal angular interval in its circumferential surface.

5. A method for measuring a tapped hole, comprising the steps of:
   (a) positioning stylus means with air discharging ports relative to a reference tapped hole;
   (b) measuring a variation of a back pressure of air supplied to each of said air discharging ports in a state in which said stylus means advances within said reference tapped hole;
   (c) converting the back pressure variation, measured in the step (b), into an electric signal and storing a value of the converted electric signal;
   (d) obtaining a conversion value for converting said electric signal value into a distance value, on the basis of distances from a position of the positioned stylus means to a thread and a root of said reference tapped hole;
   (e) measuring a variation of a back pressure of air supplied to each of said air discharging ports in a state where said stylus means advances within said tapped hole being measured;
   (f) converting the back pressure, measured in the step (e), into an electric signal value; and
   (g) obtaining distances from said stylus means to a thread, a root and a bottom of said tapped hole being measured as a function of said electric signal value, converted in the step (f), using said conversion value obtained in the step (d) to calculate a major diameter, a minor diameter, an effective diameter and a depth of said tapped hole being measured.

6. A measuring method as defined in claim 5, wherein said stylus means has a plurality of air discharging ports arranged at an equal angular interval in its circumferential surface, and said stylus means is rotated by half an angle made between the adjacent air discharging ports when said stylus means turns from an advancing movement to a retreating movement within said tapped hole.

* * * * *